United States Patent [19]

Hares et al.

[11] 4,358,542

[45] Nov. 9, 1982

[54] PHOTOCHROMIC GLASS SUITABLE FOR MICROSHEET AND SIMULTANEOUS HEAT TREATMENT AND SHAPING

[75] Inventors: George B. Hares; David J. Kerko; David L. Morse, all of Corning, N.Y.

[73] Assignee: Corning Glass Works, Corning, N.Y.

[21] Appl. No.: 252,139

[22] Filed: Apr. 8, 1981

[51] Int. Cl.$^3$ .................. C03B 23/025; C03B 33/02; C03C 3/08; C03C 3/26

[52] U.S. Cl. .................................. 501/13; 65/30.11; 65/94; 65/97; 65/105; 65/107; 501/56; 501/61; 501/62; 501/64; 501/66

[58] Field of Search ................. 65/30.11, 94, 97, 105, 65/107; 501/13, 56, 61, 62, 64, 66

[56] References Cited

U.S. PATENT DOCUMENTS

| | | | |
|---|---|---|---|
| 3,208,860 | 9/1965 | Armistead et al. | 65/30.11 X |
| 3,941,605 | 3/1976 | Yamashita | 501/13 |
| 4,018,965 | 4/1977 | Kerko et al. | 65/30.11 X |
| 4,088,470 | 5/1978 | Bourg et al. | 65/105 |
| 4,130,437 | 12/1978 | Mazeau et al. | 501/13 |
| 4,168,339 | 9/1979 | Kerko et al. | 501/13 X |
| 4,190,451 | 2/1980 | Hares et al. | 65/30.11 X |

*Primary Examiner*—Richard V. Fisher
*Attorney, Agent, or Firm*—Clinton S. Janes, Jr.

[57] ABSTRACT

The instant invention is directed to the production of photochromic glasses having compositions consisting essentially, as analyzed in weight percent on the oxide basis, of $SiO_2$—55-60
$Al_2O_3$—9-10
$B_2O_3$—19-20.5
$Li_2O$—2-2.5
$Na_2O$—2-3
$K_2O$—6-7
$PbO$—0.1-0.25
$Ag$—0.1-0.15
$Cl$—0.3-0.5
$Br$—0.05-0.15
$CuO$—0.0065-0.01

The glasses are capable of being drawn into sheet and articles cut from the sheet simultaneously shaped and photochromic properties developed therein. The glasses display a clear luminous transmittance in excess of 90% when free from tint, a darkened luminous transmittance at 20° C. below 25% when free from tint, and a fading rate at 20° C. such that the glass demonstrates a faded luminous transmittance at least twice that of the darkened transmittance after a five-minute fading interval.

6 Claims, No Drawings

PHOTOCHROMIC GLASS SUITABLE FOR MICROSHEET AND SIMULTANEOUS HEAT TREATMENT AND SHAPING

BACKGROUND OF THE INVENTION

The development of photochromic or phototropic glass began with U.S. Pat. No. 3,208,860 which teaches the utility of silver halide crystallites in glass bodies to impart photochromic characteristics thereto. The base glass compositions stated to be preferred are encompassed within the $R_2O$—$Al_2O_3$—$B_2O_3$—$SiO_2$ system consisting essentially, in weight percent on the oxide basis, of about 4–26% $Al_2O_3$, 4–26% $B_2O_3$, and 40–76% $SiO_2$, wherein $R_2O$ was selected from the group of 2–8% $Li_2O$, 4–15% $Na_2O$, 6–20% $K_2O$, 8–25% $Rb_2O$, and 10–30% $Cs_2O$, the sum of those ingredients constituting at least 85% of the total composition. To obtain the desired photochromic behavior, at least one halide is added in a minimum effective amount of 0.2% Cl, 0.1% Br, and 0.08% I and silver is added in at least the minimum indicated proportion of 0.2% where chloride is the effective halide, 0.05% where Br is the effective halide, and 0.03% where iodide is the effective halide. The patent also notes the utility of incorporating small amounts of low temperature reducing agents, such as SrO, FeO, CuO, $As_2O_3$, and $Sb_2O_3$, to enhance the photochromic properties of the glass.

The greatest commercial application for photochromic glass up to the present time has been the fabrication of spectacle lenses, both as prescription lenses and as non-prescription sunglasses. Prescription lenses, marketed under the trademark PHOTOGRAY by Corning Glass Works, Corning, N.Y., have constituted the largest segment of commercial sales. That glass has the approximate composition tabulated below in weight percent:

$SiO_2$—55.6
$B_2O_3$—16.4
$Al_2O_3$—8.9
$Li_2O$—2.65
$Na_2O$—1.85
$K_2O$—0.01
$BaO$—6.7
$CaO$—0.2
$PbO$—5.0
$ZrO_2$—2.2
$Ag$—0.16
$CuO$—0.035
$Cl$—0.24
$Br$—0.145
$F$—0.19

Inasmuch as the composition of PHOTOGRAY brand lenses comprised compromises struck between photochromic behavior, ophthalmic requirements, glass melting and forming capabilities, and the like, research was continuously undertaken to develop a glass manifesting improved photochromic characteristics, while retaining the other chemical and physical properties required in the manufacture of ophthalmic products.

Recently, prescription lenses have been marketed by Corning Glass Works under the trademark PHOTOGRAY EXTRA which darken to a greater degree and fade more rapidly than the PHOTOGRAY brand lenses. The glass for those lenses is encompassed within U.S. Pat. No. 4,190,451 and consists essentially, expressed in terms of weight percent on the oxide basis, of about:

$SiO_2$—55.8
$Al_2O_3$—6.48
$B_2O_3$—18.0
$Li_2O$—1.88
$Na_2O$—4.04
$K_2O$—5.76
$ZrO_2$—4.89
$TiO_2$—2.17
$CuO$—0.011
$Ag$—0.24
$Cl$—0.20
$Br$—0.13

Ophthalmic lenses prepared from the above two compositions have been formed in a manner similar to that employed in the production of conventional, i.e., non-photochromic, ophthalmic lenses. Thus, a glass blank is pressed and the blank then ground and polished to the desired prescription. To develop photochromic properties, the glass blank is subjected to a predetermined heat treatment.

U.S. Pat. Nos. 4,018,965 and 4,130,437 observed that the production of non-prescription photochromic glass lenses, for example, sunglass lenses, in large quantities by a process requiring the pressing of blanks followed by grinding and polishing necessarily rendered the cost of such lenses quite high. Both of those patents disclose glass compositions which are potentially photochromic and which can be drawn into glass sheet. Potentially photochromic glass sheet signifies glass sheet which, as drawn, is essentially non-photochromic but which, after exposure to an appropriate heat treatment, will display photochromic behavior. The glass compositions of each patent possess a viscosity at the liquidus of at least $10^4$ poises, generally about $10^4$–$10^6$ poises, and evidence long term stability against devitrification when in contact with platinum metal at temperatures corresponding to glass viscosities in the range of $10^4$–$10^6$ poises. As defined therein, long term stability against devitrification contemplates the growth of a crystalline layer of not more than 10 microns in thickness at the glass-platinum metal interface after a contact of 30 days. This resistance to crystallization is necessitated by the fact that the preferred sheet forming means comprises the use of a downdraw fusion pipe such as is described in U.S. Pat. Nos. 3,338,696 and 3,682,609 which may be formed from platinum metal or a platinum-clad refractory material. Thus, that method, as well as other commercially-utilized sheet drawing methods, does not provide the very rapid quenching action of conventional pressing processes for forming glass articles. This factor presents an uncertainty regarding the feasibility of producing haze-free, high-darkening, potentially photochromic glass sheet.

The glasses of each disclosure have the capability of being chemically strengthened, when present as sheet in thicknesses between about 1.3–1.7 mm, so as to comply with the Federal Food and Drug Administration (FDA) standards for eyeglass lens safety.

Finally, the preferred, potentially photochromic glass compositions of U.S. Pat. No. 4,130,437 can be simultaneously heated treated to induce photochromic behavior therein and sagged into molds to produce eyeglass lens blanks of the proper curvature, such as is described in U.S. Pat. No. 4,088,470. This latter capability, coupled with the faculty of being amenable to sheet drawing, has rendered the fabrication of sunglass lenses much more rapid and economical.

The operable ranges of glass composition disclosed in U.S. Pat. No. 4,018,965 and the preferred ranges of glass composition recorded in U.S. Pat. No. 4,130,437 are tabulated below in weight percent:

|  | U.S. Pat. No. 4,018,965 | U.S. Pat. No. 4,130,437 |
|---|---|---|
| $SiO_2$ | 54–66 | 57.1–65.3 |
| $Al_2O_3$ | 7–15 | 9.6–13.9 |
| $B_2O_3$ | 10–25 | 12–22 |
| $Li_2O$ | 0.5–4 | 1–3.5 |
| $Na_2O$ | 3.5–15 | 3.7–12 |
| $K_2O$ | 0–10 | 0–5.8 |
| $Li_2O + Na_2O + K_2O$ | 6–16 | 6–15 |
| PbO | 0–3 | 0–1.25 |
| Ag | 0.1–1 | 0.12–0.24 |
| Cl | 0.1–1 | 0.2–1 |
| Br | 0–3 | 0.06–0.25 |
| CuO | 0.008–0.16 | 0.002–0.02 |
| F | 0–2.5 | 0–2.5 |

U.S. Pat. No. 4,168,339 discloses the production of photochromic glass microsheet, i.e., sheet glass having thicknesses of about 0.25–0.5 mm. The patent utilizes the sheet drawing proces delineated in U.S. Pat. Nos. 3,338,696 and 3,682,609, supra, and comprehends the ranges of glass compositions set out below, expressed in weight percent on the oxide basis:

$SiO_2$—54–66
$Al_2O_3$—7–16
$B_2O_3$—10–30
$Na_2O$—3–15
$Li_2O$—0–4
$K_2O$—0–10
PbO—0.4–1.5
Br—0.2–0.5
Cl—0.5–1.2
F—0.2–0.5
CuO—0.008–0.03
Ag—>0.03–1

With respect to photochromic behavior, the glasses of U.S. Pat. No. 4,018,965 are stated to exhibit, at ambient temperatures, i.e., 20°–25° C., a clear luminous transmittance of at least 60%, a darkened luminous transmittance not exceeding 25%, and a fading rate such that the glass manifests a faded luminous transmittance after a 5-minute fading interval from the darkened state of at least 1.5 times that of the darkened transmittance. The glasses of U.S. Pat. No. 4,130,437 are reported to demonstrate at temperatures of 20°–25° C. a clear luminous transmittance of at least 60%, a darkened luminous transmittance below 30%, and a fading rate such that the glass evidences a faded luminous transmittance after a 5-minute fading interval from the darkened state of at least 1.75 times that of the darkened transmittance. Furthermore, after a one-hour fading period, the glass exhibits a luminous transmittance in excess of 80% of its clear luminous transmittance. The glasses of U.S. Pat. No. 4,168,339 are asserted to evidence at room temperature a darkened luminous transmittance below 50% and a fading rate such that, after a 5-minute fading interval, the transmittance will have increased by at least 20 percentage units of transmission and, after a one-hour fading period, the glass will manifest a luminous transmittance in excess of 80%. It will be appreciated that the initial clear luminous transmittance values of the glasses are in the vicinity of 90%. Tinting agents, e.g., CoO and NiO, are added to the glass composition to reduce the initial clear luminous transmittance values to levels approaching 60%. So little tinting agent is required that the photochromic properties of the glass are not substantially affected.

Whereas the photochromic behavior of those disclosed glasses is quite desirable, research has continued to seek out glasses manifesting the melting and forming characteristics of those patented compositions but which would display still further improved photochromic properties, i.e., the glasses will exhibit a deeper darkening transmittance and a more rapid fade rate. Hence, the glasses sought will demonstrate the faculty of being formed into sheet, will show long term stability against devitrification at temperatures corresponding to glass viscosities in the range of $10^4$–$10^6$ poises, can be simultaneously heat treated to develop photochromic properties therein and sagged into lenses of the proper curvature, will be chemically strengthenable to meet the FDA requirements for eyeglass lens safety, and will manifest the following photochromic properties: (a) a clear luminous transmittance in excess of 65%; (b) a darkened luminous transmittance at 20° C. below 25%; (c) a fading rate at 20° C. such that the glass demonstrates a faded luminous transmittance of at least twice that of the darkened transmittance after a five-minute fading interval from the darkened state; (d) a darkened transmittance at 40° C. below 45%; and (e) a fading rate at 40° C. such that the glass exhibits a faded luminous transmittance of at least 1.75 times that of the darkened transmittance after a five-minute fading interval from the darkened state. (Again, the clear luminous transmittance of the glasses will be in the vicinity of 90% without conventional tinting agents.)

SUMMARY OF THE INVENTION

Glasses exhibiting that matrix of forming and physical properties can be achieved utilizing an extremely narrow range of potentially photochromic compositions which are heat treated in a tightly-defined manner to generate the desired photochromic behavior therein. Thus, as analyzed in weight percent on the oxide basis, the inventive glasses consist essentially of $SiO_2$—55–60
$Al_2O_3$—9–10
$B_2O_3$—19–20.5
$Li_2O$—2–2.5
$Na_2O$—2–3
$K_2O$—6–7
PbO—0.1–0.25
Ag—0.1–0.15
Cl—0.3–0.5
Br—0.05–0.15
CuO—0.0065–0.01

Minor amounts of conventional colorants such as up to 1% total of transition metal oxides, e.g., CoO, NiO, $Cr_2O_3$, $Fe_2O_3$, and $V_2O_5$, and/or up to 5% total of rare earth oxides, e.g., $Er_2O_3$, $Ho_2O_3$, $Nd_2O_3$, and $Pr_2O_3$, may optionally be included to impart tint to the glass. The glasses exhibit a clear luminous transmittance in the vicinity of 90% when free from tint.

Heat treatment temperatures between about 650°–675° C. have been found necessary to generate the desired photochromic behavior, the time of heat treatment required being dependent upon the thickness of the sheet and the composition of the glass. For example, where glass sheet having a thickness of about 1.5 mm or articles cut from that sheet are heat treated by passing through a lehr, the glass is exposed to the operable range of temperatures for no more than about six minutes, customarily about 3-5 minutes.

The glasses exhibit long term stability against devitrification at temperatures corresponding to glass viscosities in the range of $10^4$–$10^6$ poises, an opalization liquidus temperature-glass viscosity relationship such that phase separation does not occur as glass is drawn into sheet, excellent chemical durability, the capability of being chemically strengthened to modulus of rupture values in excess of 30,000 psi with a depth of compression layer in excess of 0.025 inch, preferably about 0.028-0.032 inch, and, after heat treatment, the following photochromic properties:

(a) a clear luminous transmittance in excess of 65%;
(b) a darkened luminous transmittance at 20° C. of below 25% when the glass is free from tint and below 20% when the glass is tinted to a level of at least 75%, and a fading rate such that the glass demonstrates a luminous transmittance of at least twice that of the darkened transmittance after a five-minute fading interval from the darkened state; and
(c) a darkened luminous transmittance at 40° C. of below 45% when the glass is free from tint and below 40% when the glass is tinted to a level of at least 75%, and a fading rate such that the glass demonstrates a luminous transmittance of at least 1.75 times that of the darkened transmittance after a five-minute fading interval from the darkened state.

The glasses also possess the advantageous capability of being able to be simultaneously heat treated to develop photochromic behavior therein and sagged into molds to produce lenses of a desired curvature without touching the inside surface of the molds.

The method of the instant invention contemplates the following four general steps:

(1) a glass-forming batch of the proper composition is melted;
(2) the temperature of at least one region of the glass melt is adjusted to provide a viscosity therein of about $10^4$–$10^6$ poises;
(3) the glass melt at a viscosity of about $10^4$–$10^6$ poises is drawn past forming means to produce potentially photochromic drawn glass sheet of optical quality; and then
(4) the glass sheet or an article cut therefrom is exposed to a temperature between about 650°-675° C. for a sufficient length of time to develop photochromic behavior therein.

Where articles, e.g., lenses, are to be simultaneously shaped from the glass sheet and photochromic properties developed therein in accordance with U.S. Pat. No. 4,088,470,
step (4) will be modified to encompass three elements:

(a) the glass sheet will be cooled below the softening point of the glass and articles of desired geometries cut therefrom;
(b) the articles will be edge supported on alveolated molds; and then
(c) the articles will be subjected to a temperature between about 650°-675° C. for a sufficient length of time to simultaneously sag the glass to a desired curvature into the concave portions of the alveolated molds, but not into contact with the inner surface thereof, and develop photochromic behavior in the glass.

DESCRIPTION OF PREFERRED EMBODIMENT

A glass batch was compounded and melted at a temperature of about 1400° C. The molten glass was fed into an overflow downdrawn fusion pipe at a viscosity of about $10^4$ poises and delivered from the pipe as drawn glass sheet having a thickness of about 1.5 mm. The drawn sheet was cooled below the glass softening point and separated into sections of sheet glass from which small samples of desired geometries were cut. The glass had the approximate analysis in weight percent on the oxide basis:

$SiO_2$—59.3
$Al_2O_3$—9.6
$B_2O_3$—19.7
$Li_2O$—2.2
$Na_2O$—2.4
$K_2O$—6.3
$PbO$—0.12
$Ag$—0.13
$Cl$—0.33
$Br$—0.055
$CuO$—0.008
$CoO$—0.031
$NiO$—0.073

The sheet glass samples were then subjected to a heat treatment designed to simultaneously sag the sheet into alveolated molds to a desired curvature and develop photochromic behavior in the glass. Hence, as is described in U.S. Pat. No. 4,088,470, the samples of sheet glass were edge supported on alveolated molds to prevent surface damage thereto and the molds introduced into a lehr having a temperature at the opening thereof of about 500° C. As the glass samples passed through the lehr, they were exposed to a temperature of about 665° C. and maintained at that temperature for about five minutes. Thereafter, the glass samples passed into a cooler zone in the lehr to quickly reduce the temperature thereof to about 570° C. After about ten minutes, the samples were cool enough to withdraw from the lehr belt. Examination thereof indicated that the glass had sagged into the molds but did not contact the inner surfaces thereof.

The samples were removed from the molds and subjected to a chemical strengthening process which constituted immersing them into a bath of molten 60% by weight $KNO_3$ and 40% by weight $NaNO_3$ operating at 400° C. After removal from the bath, the samples were cooled, the salt clinging thereto was washed off in tap water, and tests for strength and photochromic properties were conducted.

Modulus of rupture levels in excess of 30,000 psi could be obtained and depths of surface compression layers in excess of 0.025 inch were observed, with the preferred thicknesses ranging between about 0.0028-0.0032 inch.

Although the present photochromic glass is activated by radiation in the ultraviolet and low visible portions of the spectrum, experience has shown that, frequently, the correlation between test data obtained using an ultraviolet lamp and values measured via solar radiation outdoors was poor. Consequently, in order to achieve better correlation with outdoor solar exposure, a "solar simulator" was devised.

Hence, the solar simulator apparatus, as described in U.S. Pat. No. 4,125,775, utilizes a 150 watt xenon arc source fitted with a filter to modify the spectral output thereof so as to closely approach the solar spectrum, particularly in the ultraviolet, blue, and red portions. The infrared region of the spectrum is attenuated with a layer of water of sufficient thickness to provide equal irradiance to that of the sun, but with no special regard for the spectral distribution within that region.

The intensity of the arc source was adjusted such that the amount of darkening was identical to that of a number of commercially available photochromic glasses, including PHOTOGRAY ® lens blanks, darkened outdoors at noon during a cloudless summer day in Corning, N.Y. (air mass value of about 1.06). Numerous experimental photochromic glasses of widely-variant compositions were also exposed to the solar simulator and to outdoor sunlight. Excellent overall agreement was noted in comparison between the data secured.

To provide continuous monitoring of the darkened transmittance demonstrated by the specimens, each sample was interrogated with a chopped beam of light from a tungsten-halogen lamp detected by a PIN silicon photodiode whose output was demodulated by a lock-in amplifier. A composite color filter was placed into the beam to approximate the response of the human eye under Illuminant C, as defined by C.I.E.

The apparatus was interfaced to a PDP-11/04 computer (marketed by Digital Equipment Corporation, Maynard, Mass.) to enable automatic sample change, temperature selection, event sequencing, and data collection, storage, reduction, and retrieval with a minimum of operator's involvement.

The glass composition recited above exhibited a fully faded luminous transmittance of about 70% in a 1.5 mm thick photochromic, heat treated and sagged sample produced in accordance with the above-described method. After an exposure of 15 minutes to the solar simulator source at 20° C., a darkened luminous transmittance of about 18% was measured. Upon removal of the solar simulator source for five minutes, the glass faded about 25 luminous percentage units to about 43%. Upon exposure for 15 minutes to the solar simulator source at 40° C., a darkened luminous transmittance of about 36% was measured. After withdrawal of the solar simulator source for five minutes, the glass faded about 29 luminous percentage units to a transmittance of about 65%.

The fully faded luminous transmittance of a 1.5 mm thick photochromic, heat treated and sagged sample of the glass composition recited above, but without the colorants NiO and CoO, produced in the laboratory from sheet drawn over a platinum orifice was about 91%. After an exposure of 15 minutes to the solar simulator source at 20° C., a darkened luminous transmittance of about 23% was measured. After withdrawal from the solar simulator source for five minutes, the glass faded about 28 luminous percentage units to a transmittance of about 51%. When exposed for 15 minutes to the solar simulator source at 40° C., a darkened luminous transmittance of about 42% was measured. Upon removal from the solar simulator source for five minutes, the glass faded about 45 luminous percentage units to a transmittance of about 87%.

We claim:

1. A photochromic glass composition consisting essentially, as analyzed in weight percent on the oxide basis, of $SiO_2$—55–60
$Al_2O_3$—9–10
$B_2O_3$—19–20.5
$Li_2O$—2–2.5
$Na_2O$—2–3
$K_2O$—6–7
$PbO$—0.1–0.25
$Ag$—0.1–0.15
$Cl$—0.3–0.5
$Br$—0.05–0.15
$CuO$—0.0065–0.01 demonstrating long term stability against devitrification at temperatures corresponding to glass viscosities in the range of $10^4$–$10^6$ poises, an opalization liquidus temperature-glass viscosity relationship such that phase separation does not occur as glass is drawn into sheet, excellent chemical durability, and the capability of being chemically strengthened to modulus of rupture values in excess of 30,000 psi with a depth of compression layer in excess of 0.025 inch, said glass, in a cross section of about 1.5 mm, exhibiting the following photochromic properties:

(a) a clear luminous transmittance in the vicinity of 90% when free from tint;

(b) a darkened luminous transmittance at 20° C. below 25% when the glass is free from tint, and below 20% when the glass is tinted to a level of at least 75%;

(c) a fading rate at 20° C. such that the glass demonstrates a faded luminous transmittance of at least twice that of the darkened transmittance after a five-minute fading interval from the darkened state;

(d) a darkened luminous transmittance at 40° C. below 45% when the glass is free from tint, and below 40% when the glass is tinted to a level of at least 75%; and (e) a fading rate at 40° C. such that the glass demonstrates a faded luminous transmittance of at least 1.75 times that of the darkened transmittance after a five-minute fading interval from the darkened state.

2. A photochromic glass according to claim 1 also containing up to 1% total of transition metal oxide and/or up to 5% total rare earth metal oxide colorants.

3. A photochromic glass according to claim 2 wherein said transition metal oxide is selected from the group of $CoO$, $Cr_2O_3$, $Fe_2O_3$, $NiO$, and $V_2O_5$ and said rare earth metal oxide is selected from the group of $Er_2O_3$, $Ho_2O_3$, $Nd_2O_3$, and $Pr_2O_3$.

4. A method for forming glass sheet from potentially photochromic glass and thereafter simultaneously shaping articles from said glass sheet and developing photochromic properties therein which comprises the steps of:

(a) melting a batch for a glass consisting essentially, as analyzed in weight percent on the oxide basis, of $SiO_2$—55–60
$Al_2O_3$—9–10
$B_2O_3$—19–20.5
$Li_2O$—2–2.5
$Na_2O$—2–3
$K_2O$—6–7
$PbO$—0.1–0.25
$Ag$—0.1–0.15
$Cl$—0.3–0.5
$Br$—0.05–0.15
$CuO$—0.0065–0.01

(b) adjusting the temperature of at least one region of the glass melt to provide a viscosity therein of about $10^4$–$10^6$ poises;

(c) drawing the glass melt at a viscosity of about $10^4$–$10^6$ poises to produce potentially photochromic drawn glass sheet of optical quality;

(d) cooling the glass sheet below the softening point of the glass and cutting articles of desired geometries therefrom;

(e) edge supporting said articles on alveolated molds; and then (f) subjecting heating said articles at a temperature between about 650°–675° C. for a period of time sufficient to simultaneously sag the glass to a desired curvature into the concave portions of the alveolated molds, but not into contact with the inner surface of said molds, and develop photochromic properties in the glass; said glass demonstrating long term stability against devitrification at temperatures corresponding to glass viscosities in the range of $10^4$–$10^6$ poises, an opalization liquidus temperature-glass viscosity relationship such that phase separation does not occur as glass is drawn into sheet, excellent chemical durability, the capability of being chemically strengthened to modulus of rupture values in excess of 30,000 psi with a depth of compression layer in excess of 0.025 inch, and, in a cross section of about 1.5 mm, exhibiting the following photochromic properties:

(a) a clear luminous transmittance in excess of 90% when free from tint;

(b) a darkened luminous transmittance at 20° C. below 25% when the glass is free from tint, and below 20% when the glass is tinted to a level of at least 75%;

(c) a fading rate at 20° C. such that the glass demonstrates a faded luminous transmittance of at least twice that of the darkened transmittance after a five-minute fading interval from the darkened state;

(d) a darkened luminous transmittance at 40° C. below 45% when the glass is free from tint, and below 40% when the glass is tinted to a level of at least 75%; and (e) a fading rate at 40° C. such that the glass demonstrates a faded luminous transmittance of at least 1.75 times that of the darkened transmittance after a five-minute fading interval from the darkened state.

5. A method according to claim 4 wherein said glass also contains up to 1% total of transition metal oxide and/or up to 5% total of rare earth metal colorants.

6. A method according to claim 5 wherein said transition metal oxide is selected from the group of $CoO$, $Cr_2O_3$, $Fe_2O_3$, $NiO$, and $V_2O_5$ and said rare earth metal oxide is selected from the group of $Er_2O_3$, $Ho_2O_3$, $Nd_2O_3$, and $Pr_2O_3$.

* * * * *